(12) United States Patent
Granda et al.

(10) Patent No.: US 11,420,865 B2
(45) Date of Patent: Aug. 23, 2022

(54) FUEL DELIVERY SYSTEM

(71) Applicant: Solar Turbines Incorporated, San Diego, CA (US)

(72) Inventors: Gino H. Granda, Bonita, CA (US); Juan Covarrubias, Riverside, CA (US); Miguel X. Angel, Escondido, CA (US); Steffen P. Thompson, San Diego, CA (US); David Chen, Rosemead, CA (US)

(73) Assignee: Solar Turbines Incorporated, San Diego, CA (US)

( * ) Notice: Subject to any disclaimer, the term of this patent is extended or adjusted under 35 U.S.C. 154(b) by 309 days.

(21) Appl. No.: 16/736,642

(22) Filed: Jan. 7, 2020

(65) Prior Publication Data
US 2021/0206623 A1 Jul. 8, 2021

(51) Int. Cl.
  B67D 7/62 (2010.01)
  B67D 7/76 (2010.01)
  B67D 7/70 (2010.01)
  B67D 7/04 (2010.01)

(52) U.S. Cl.
  CPC ............... B67D 7/62 (2013.01); B67D 7/04 (2013.01); B67D 7/70 (2013.01); B67D 7/76 (2013.01)

(58) Field of Classification Search
  CPC ... B67D 7/04; B67D 7/62; B67D 7/70; B67D 7/76; F02C 7/236
  USPC ...................................................... 141/231
  See application file for complete search history.

(56) References Cited

U.S. PATENT DOCUMENTS

| 5,441,234 | A | 8/1995 | White et al. |
| 5,884,675 | A * | 3/1999 | Krasnov ................... F17C 5/06 141/18 |
| 6,732,769 | B2 * | 5/2004 | Del Campo ............ A62C 3/00 141/231 |
| 7,093,626 | B2 * | 8/2006 | Li ......................... F17C 11/005 141/231 |
| 8,069,885 | B2 * | 12/2011 | Kederer .................. F17C 5/007 141/104 |
| 8,109,300 | B2 * | 2/2012 | Brakefield ........... B67D 7/0476 141/67 |
| 8,245,889 | B1 | 8/2012 | Starns |
| 8,740,251 | B2 * | 6/2014 | Batson ..................... B64F 1/28 280/839 |
| 9,194,298 | B2 * | 11/2015 | Thompson ............. F01D 25/24 |
| 9,377,164 | B2 | 6/2016 | Utal et al. |
| 9,885,287 | B2 * | 2/2018 | Striker ..................... F02C 9/28 |
| 2003/0056514 | A1 * | 3/2003 | Lohn ......................... F02C 9/40 60/734 |
| 2017/0333814 | A1 | 11/2017 | Yancy et al. |

FOREIGN PATENT DOCUMENTS

WO   2014086414 A1   6/2014

* cited by examiner

Primary Examiner — Timothy L Maust
(74) Attorney, Agent, or Firm — Procopio, Cory, Hargreaves & Savitch LLP

(57) ABSTRACT

A fuel delivery system having a base, a fuel inlet configured to receive fuel from a secondary fuel supply, a fuel outlet configured to deliver fuel to a machine, a filter assembly and a coalescer configured to filter the fuel, a fuel controller configured to regulate pressure of the fuel that will be delivered to a machine, a boost pump assembly and a main pump assembly configured to pressurize the fuel.

17 Claims, 4 Drawing Sheets

FUEL DELIVERY SYSTEM

TECHNICAL FIELD

The present disclosure generally pertains to machines. More particularly this application is directed toward a fuel delivery system for a machine.

BACKGROUND

Gas turbine engines are typically assembled into a "turbine package" on a base. In particular, the gas turbine engine and certain support systems are installed on a support platform, keeping systems necessary to the turbine's operation together. In some instances, an auxiliary system may be located on a separate platform or "skid".

U.S. Pat. No. 9,194,298 to Thompson et al. describes a fuel boost module for a gas turbine engine having a base, a fuel inlet configured to receive fuel from a fuel supply, a fuel outlet configured to deliver fuel to the gas turbine engine, a filter assembly configured to filter the fuel, a fuel controller configured to regulate pressure of the fuel that will be delivered to the gas turbine engine, a boost pump configured to pressurize the fuel, and a main pump configured to pressurize the fuel.

The present disclosure is directed toward improvements in the art.

SUMMARY

A fuel delivery system for a machine is disclosed herein. In embodiments the fuel delivery system includes a base disposed separate from the machine, an electrical control system mounted to the base, and a fuel conditioning assembly mounted to the base. The fuel conditioning assembly includes a fuel inlet and a boost pump assembly in electrical communication with the electrical control system and in fluid communication with the fuel inlet. The fuel conditioning assembly further includes a filter assembly in fluid communication with the boost pump assembly and a coalescer in fluid communication with the filter assembly. The fuel conditioning assembly further includes a fuel controller in fluid communication with the coalescer. The fuel conditioning assembly further includes a main pump assembly in electrical communication with the electrical control system and in fluid communication with the fuel controller. The fuel conditioning assembly further includes a fuel outlet in fluid communication with the fuel controller.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that embodiments of the disclosure can be practiced without these specific details. In some instances, well-known structures and components are shown in simplified form for brevity of description.

Figure 1:
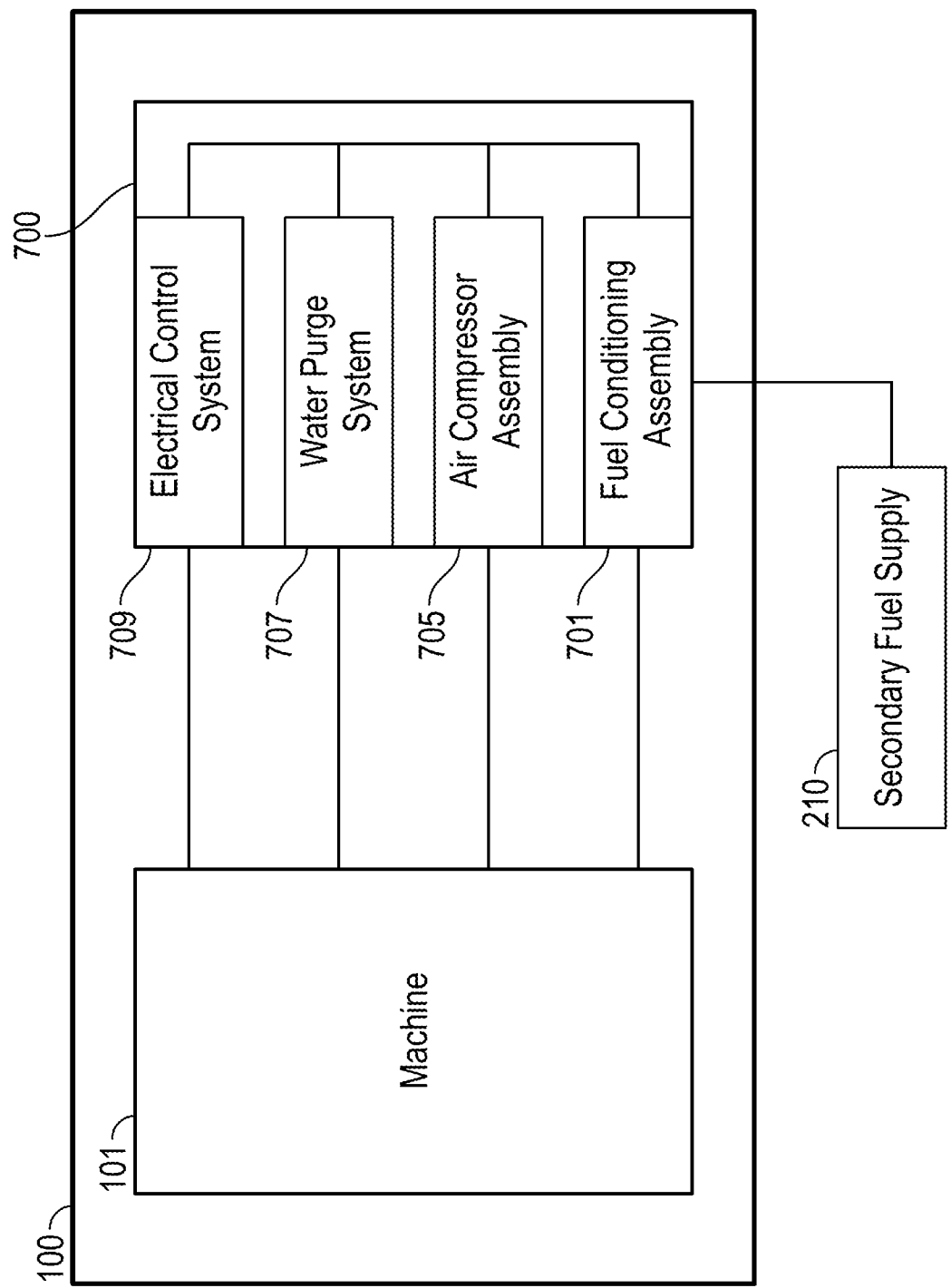
FIG. 1 is a functional block diagram of an exemplary machine package in fluid connection with a secondary fuel supply.

FIG. 1 is a functional block diagram of an exemplary gas turbine engine package connected to a secondary fuel source.

A machine package 100 can include a machine 101 (such as a gas turbine engine) and a fuel delivery system 700 (sometimes referred to as a portable fuel delivery system). In embodiments the machine package 100 is a gas turbine engine package and the machine 101 is a gas turbine engine and may be referred to as such herein.

Generally, the gas turbine engine 101 includes an inlet, a compressor, a combustor, a turbine, an exhaust, and a power output coupling. One or more of the rotating components are coupled by one or more shafts.

Air enters the gas turbine engine inlet and is compressed by the compressor. Once compressed, air leaves the compressor and enters the combustor, where it is diffused and fuel is added. In particular, fuel is supplied to a plurality of fuel injectors from a gas fuel source or an auxiliary fuel delivery system 700.

After the combustion reaction, energy is then extracted from the combusted fuel/air mixture via the turbine. Exhaust gas then exits the system.

The fuel delivery system 700 can include a fuel conditioning assembly 701, an air compressor assembly 705, a water purge system 707, and an electrical control system 709.

The fuel conditioning assembly 701 can receive fuel, such as liquid fuel, from the secondary fuel supply 210. The fuel conditioning assembly 701 can filter and transport the fuel to the gas turbine engine 101. The fuel conditioning assembly 701 can be in fluid communication with the air compressor assembly 705 and receive compressed air from the air compressor assembly 705 to actuate components of the fuel conditioning assembly 701.

The air compressor assembly 705 can be in fluid communication with the gas turbine engine 101 and can provide compressed air for a liquid fuel startup torch and an air atomizing manifold.

The water purge system 707 can be in fluid communication with the gas turbine engine 101 and can purge liquid fuel from the fuel lines between transitions from liquid to gas fueling of the gas turbine engine 101 and can prevent the fuel lines from coking.

The electrical control system 709 can be in electrical communication with the fuel conditioning assembly 701, the air compressor assembly 705, and the water purge system 707 and can control components of these assemblies and systems. The electrical control system 709 can be in electrical communication with the gas turbine engine 101 and can receive information from a Programmable Logic Controller (PLC) of the gas turbine engine 101.

Figure 2:
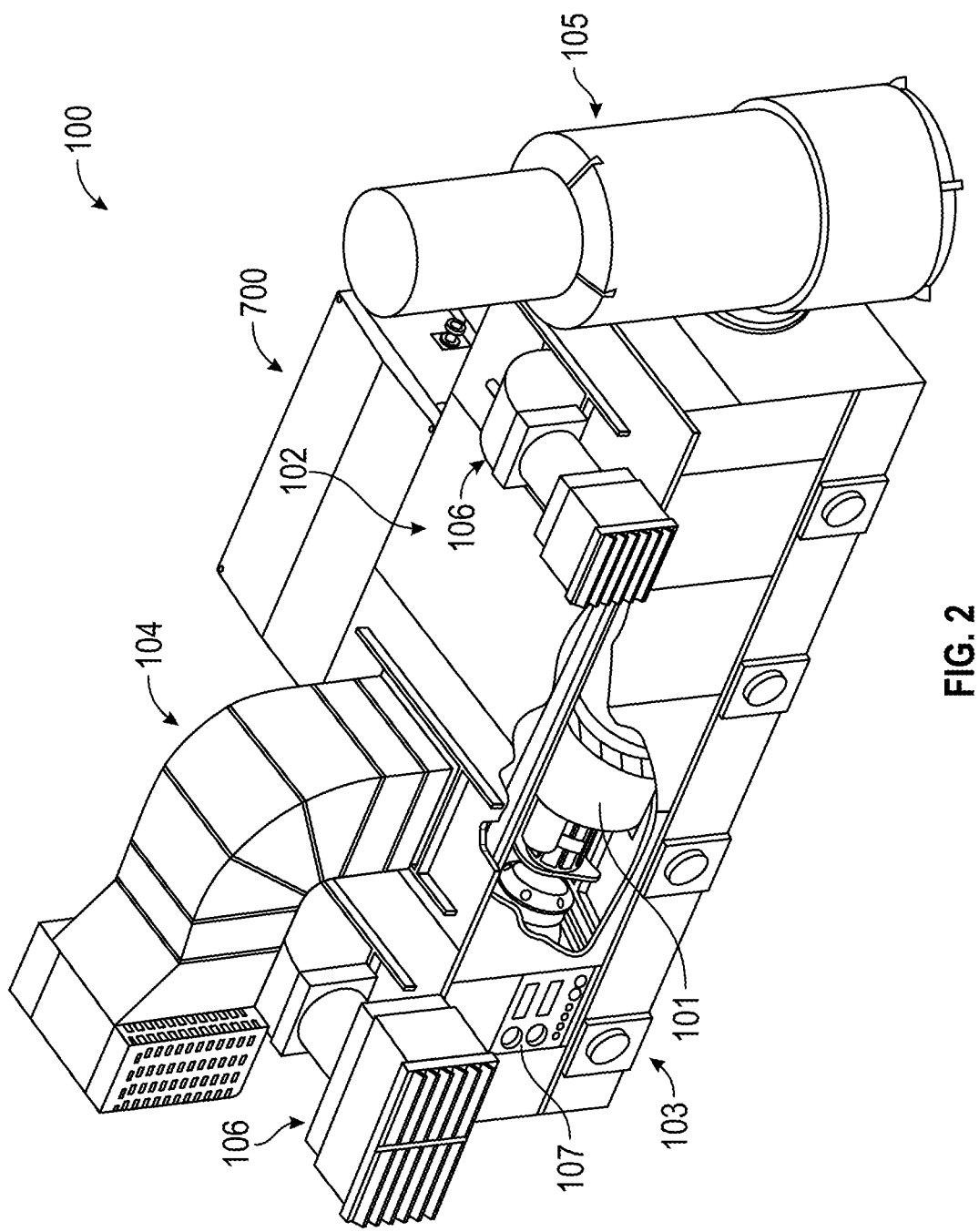
FIG. 2 is an isometric view of the machine package from FIG. 1.

FIG. 2 is an isometric view of a gas turbine engine package from FIG. 1. Some of the surfaces have been left out or exaggerated (here and in other figures) for clarity and ease of explanation.

The gas turbine engine package 100 may include the gas turbine engine 101, an enclosure 102, and a support platform 103. The gas turbine engine 101 may be mounted to and supported by the support platform 103. In addition, the gas turbine engine 101 may be housed in the enclosure 102. The gas turbine engine package 100 may also include one or more auxiliary features such as an inlet duct 104, an exhaust duct 105, one or more vents 106, and a control panel 107, for example.

The fuel delivery system 700 can be located off of and spaced from the support platform 103.

Figure 3:
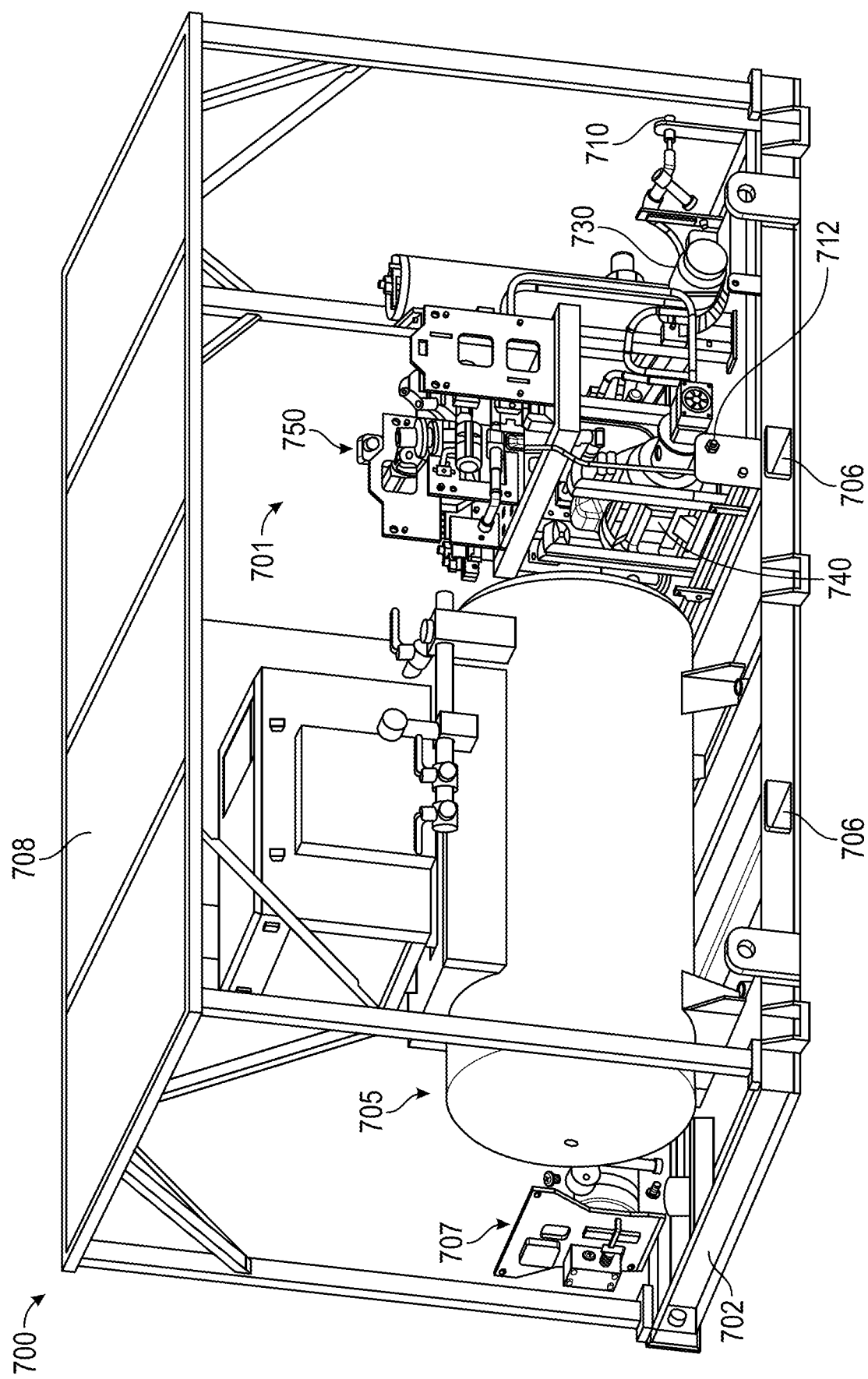
FIG. 3 is an isometric view of the exemplary fuel delivery system from FIG. 1.

FIG. 3 is an isometric view of the exemplary fuel delivery system from FIG. 1. The fuel delivery system 700 is shown as a stand-alone structure having the functional components to supply fuel to the injectors of gas turbine engine 101 (shown in FIG. 1). In FIG. 3 and in other figures, some of the surfaces, conduit, and plumbing have been left out or exaggerated for clarity and ease of explanation. For example electrical conduit and compressed air conduit are not shown on the figures.

The fuel conditioning assembly 701 can include a fuel inlet 710, a fuel outlet 712, a boost pump assembly 730, and main pump assembly 740, and a fuel controller 750. The fuel controller 750 can be positioned above the main pump assembly 740.

The fuel inlet 710 can be an interface to couple with a fuel conduit to receive fuel from a secondary fuel supply 210 (Shown in FIG. 2). In particular, the fuel inlet 710 can be a liquid fuel coupling that receives liquid fuel for the fuel delivery system 700. For example, the fuel inlet 710 may include a 1" quick release nipple. Also for example, the fuel inlet 710 may include a metric flange, or any conventional coupling meeting the particular specifications of the fuel system of the gas turbine engine 101 and the facility where the gas turbine engine 101 is located. The fuel conduit may have a 1" quick release couple. The fuel conduit may include any conventional fuel plumbing and intervening structures, such has rigid and flexible hoses.

The fuel outlet 712 can be an interface to couple with a fuel conduit to deliver fuel to a gas turbine engine 101. In particular, the fuel outlet 712 can be a liquid fuel coupling that outputs pressurized and regulated liquid fuel from the fuel delivery system 700. For example, the fuel outlet 712 may include a 1" quick release nipple. Also for example, the fuel outlet 712 may include a metric flange, or any other coupling meeting the particular specifications of the fuel system. According to one embodiment, the fuel outlet 712 may include a plurality of outlet lines. For example the fuel outlet 712 may include an outlet line for main fuel, for pilot fuel, and/or liquid fuel to torch (i.e. ignition/start up torch).

The base 702 may be a structural platform configured to unite and support the functional components of the fuel delivery system 700. The functional components may be configured on the base 702 in such a way as to minimize their footprint. The functional components may be further configured on the base 702 with sufficient weight distribution and balance to provide for transportation using conventional means, such as using forklifts, cranes, pallet jacks, etc. In addition, the functional components may be oriented to provide ease of access and maintenance. Furthermore, the functional components may be configured to minimize plumbing quantity and plumbing complexity.

According to one embodiment, the base 702 may conform to one or more pallet standards. For example, the base 702 may configured to conform in dimension (e.g., width and length), weight, to be lifted by fork trucks with typical fork spacing, high capacity fork trucks (e.g. 10,000 lb. capacity), and/or for entry to one or more pallet standards. The pallet standards may be promulgated by, for example, International Organization for Standardization (ISO), Grocery Manufacturers' Association (GMA), European Pallet Association (EPAL), Australian Standard Pallet, DOD (e.g., MIL-STD-1660), etc. According to one embodiment, the base 702 may fit within a standard ISO container with approximate external dimensions of 40' long×8.5' tall×8' wide. According to another embodiment, the base 702 may measure approximately 60.00"×36.00" (1524 mm×914 mm). According to another embodiment, the base 702 may measure no more than 48.00"×40.00" (1219 mm×1016 mm). According to another embodiment, the base 702 may measure between 60.00"×48.00" (1524 mm×1219 mm) and 40.00"×35.00" (1016 mm×889 mm). According to another to another embodiment, the base 702 may include a two-way or a four way entry 706, where each entry is configured to receive conventional forklift tongs and be therein lifted. For example, the entry 706 may include openings of a size and spacing to receive conventional forklift tongs. Moreover, the weight distribution on the base 702 may be sufficiently such that a forklift may lift and transport the fuel delivery system 700 via the entry 706.

According to one embodiment, the fuel delivery system 700 may also include a cover 708. As illustrated, the cover 708 may be a frame-type cover. In particular, the cover 708 may include vertical supports joined to the corners of the base 702 and configured to provide additional structural support and increase overall strength and rigidity to the base 702. Also, the cover 708 may include one or more horizontal cross beams between the vertical supports to provide landing areas for additional features, interfaces, and components, as well as structural support. In addition, as a frame-type cover, the cover 708 may include substantially open sides, providing open side access to the functional components resident on the base 702. According to one embodiment, the cover 708 may cover the top of the fuel delivery system 700 while leaving the sides of the fuel delivery system 700 exposed.

According to one embodiment, the cover 708 may have an outer perimeter equal to at least the footprint of the base 702.

Figure 4:
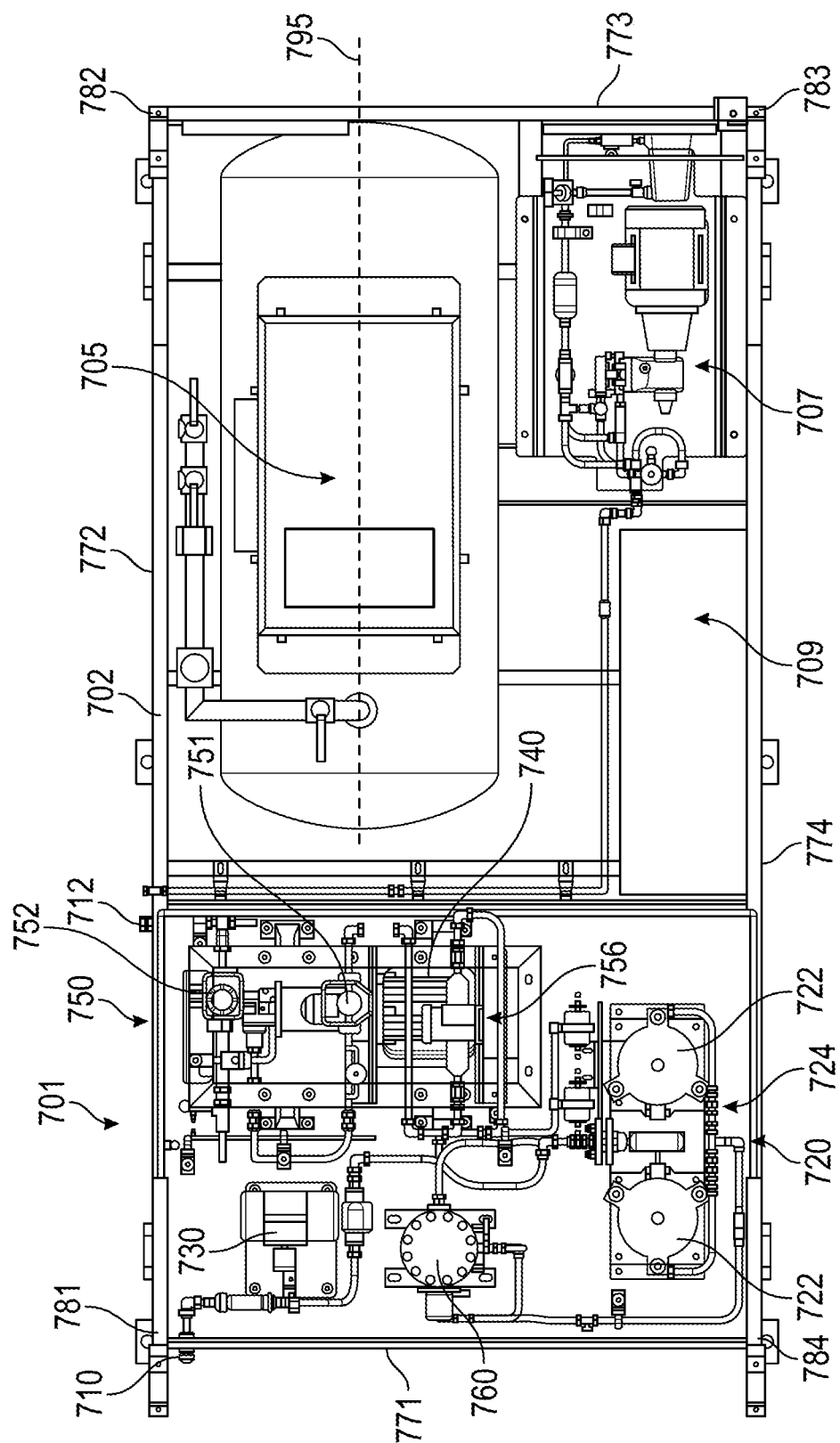
FIG. 4 is a top view of the fuel delivery system from FIG. 3 with the cover removed.

FIG. 4 is a top view of the exemplary fuel delivery system from FIG. 3 with the cover removed. The base 702 can have a rectangular shaped footprint. The base can include a first side 771, a first corner 781, a second side 772, a second corner 782, a third side 773, a third corner 783, a fourth side 774, and a fourth corner 784. The first side 771 can be generally opposite of and parallel with the third side 773. The second side 772 can be generally opposite of and parallel with the fourth side 774. The first side 771 and third side 773 can be generally perpendicular to the second side 772 and the fourth side 774. The first side 771 and the third side 773 can be generally the same length. The second side 772 and the fourth side 774 can be generally the same length. The first side 771 and the third side 773 can be shorter than the second side 772 and the fourth side 774.

The first corner 781 can be located at the convergence of the first side 771 and the second side 772. The second corner 782 can be located at the convergence of the third side 773 and the second side 772. The third corner 783 can be located at the convergence of the third side 773 and the fourth side 774. The fourth corner 784 can be located at the convergence of the first side 771 and the fourth side 774. The first corner 781 and the third corner 783 can be opposite of each other. The second corner 782 and the fourth corner 784 can be opposite of each other.

The fuel inlet 710 can be positioned proximate to the first corner 781. The fuel outlet 712 can be positioned along the second side 772.

The fuel conditioning assembly 701 can include a filter assembly 720, a boost pump assembly 730, a main pump assembly 740, a fuel controller 750, and a coalescer 760. The filter assembly 720 is a fuel filter configured to filter the liquid fuel before entering the gas turbine engine 101. In particular, the filter assembly 720 removes contaminants and/or foreign matter from liquid fuel. For example, the filter assembly 720 may include a double stacked (having two filter elements) 10 micron particulate diesel oil filter. Also for example, the filter assembly 720 may include any other fuel filter meeting the particular specifications of the fuel delivery system 700. According to one embodiment, the filter assembly 720 may be mounted (entirely or partially) to an intervening structure, such as a simple support bracket or an entire support structure. The intervening structure can be coupled to the base 702, via bolts, rivets, weld joints, and/or any other conventional mechanical coupling or joining.

The filter assembly 720 can be positioned proximate to the first side 771 and the fourth side 774. In an embodiment the filter assembly 720 is closer to the fourth corner 784 than the boost pump assembly 730, the main pump assembly 740, the fuel controller 750, the coalescer 760, the air compressor assembly 705, the water purge system 707, and the electrical control assembly 709. The filter assembly 720 can be positioned between the fuel controller 750 and the fourth side 774. The filter assembly 720 can be positioned between the coalescer 760 and the fourth side 774. The filter assembly 720 can be positioned between the electrical control assembly 709 and the first side 771. The filter assembly 720 can be positioned diagonally opposite from the air compressor assembly 705.

According to one embodiment, the filter assembly 720 may include a plurality of filter elements 722 or canisters. In particular, the filter assembly 720 may include a dual fuel filter assembly. In addition, the filter assembly 720 may include plumbing to provide for replaceability and/or redundancy. For example, as illustrated, the filter elements 722 may be plumbed in parallel with a crossover valve assembly 724 at their outlets. In this configuration, the crossover valve assembly 724 may bypass one of the filter elements 722 during operation, and provide for replacement of the bypassed filter element 722 without suffering downtime of the filter assembly 720. The filter elements 722 can be positioned to facilitate access for maintenance.

In an embodiment the filter assembly 720 is in fluid communication with the boost pump assembly 730, and can be fluidly positioned (referring to the position of components in the fuel delivery path) between the fuel outlet 712 and the boost pump assembly 730.

The boost pump assembly 730 can be positioned proximate to the first side 771 and the second side 772. In an embodiment the boost pump assembly 730 is closer to the first corner 781 than the fuel filter assembly 720, the main pump assembly 740, the fuel controller 750, the coalescer 760, the air compressor assembly 705, the water purge system 707, and the electrical control assembly 709.

The boost pump assembly 730 can be positioned between the second side 772 and the filter assembly 720. The boost pump assembly 730 can be positioned between the coalescer 760 and the second side 772. The boost pump assembly 700 can be positioned between the fuel controller 750 and the first side 771. The boost pump assembly 730 can be positioned diagonally opposite from the water purge system 707. In an embodiment the boost pump assembly 730 is closer to the fuel inlet 710 than the fuel filter assembly 720, the main pump assembly 740, the fuel controller 750, the coalescer 760, the air compressor assembly 705, the water purge system 707, and the electrical control assembly 709.

The boost pump assembly 730 can include a boost pump and a boost pump driver configured to pressurize the liquid fuel entering the fuel delivery system 700. In particular, the boost pump assembly 730 is fluidly coupled to and fluidly positioned between the fuel inlet 710 and the filter assembly 720.

According to one embodiment, the boost pump assembly 730 is configured to impart sufficient pressure to the fuel to cause the fuel to travel through the filter assembly 720 throughout a duty cycle of the gas turbine engine, and with sufficient residual head to meet any downstream requirements (e.g., minimum inlet pressure of the main pump assembly 740). For example, boost pump assembly 730 may include a fluid pump rated at or around 10 GPM (37.8 LPM). Also for example, the boost pump assembly 730 may include an electric motor rated at or around 1 HP (¾ kW) and 230 VAC or 460 VAC. The electric motor can be powered and/or controlled by the electrical control system 709. Alternatively, the boost pump assembly 730 may include any other fuel pump and driver configuration meeting the particular specifications of the fuel system.

According to one embodiment, the boost pump assembly 730 may include a pump filter (not shown). In particular, the pump filter may be a separate filter configured to keep foreign objects out of the boost pump assembly 730. For example, the pump filter may be an additional 75 micron boost filter just upstream of the fluid pump.

The coalescer 760 can be positioned proximate to the first side 771. In an embodiment the coalescer 760 is positioned between the filter assembly 720 and the boost pump assembly 730. The coalescer 760 can be positioned between the main pump assembly 740 and the first side 771. The coalescer 760 can be positioned between the fuel controller 750 and the first side 771.

The coalescer 760 can be in fluid communication with the filter assembly 720. The coalescer can be used to remove liquid particulates not filtered out by the filter assembly 720. In an embodiment the coalescer 760 can be fluidly positioned between the fuel outlet 712 and the boost pump assembly 730.

The main pump assembly 740 can be positioned closer to the first side 771 than the third side 773. In and embodiment the main pump assembly 740 is positioned between the coalescer 760 and the third side 773. In and embodiment the main pump assembly 740 is positioned between the filter assembly 720 and the second side 772.

Similar to the boost pump assembly 730, the main pump assembly 740 can include a main fluid pump and a main pump driver configured to pressurize the liquid fuel before leaving the fuel delivery system 700. In particular, the main pump assembly 740 is fluidly coupled to and fluidly positioned between the filter assembly 720 and the fuel controller 750.

According to one embodiment, the main pump assembly 740 is configured to impart sufficient pressure to the liquid fuel throughout a duty cycle of the gas turbine engine, with regulation provided by the fuel controller 750. For example, the main pump assembly 740 can include a main fluid pump rated at or around 10 GPM (37.8 LPM). Also for example, the main pump assembly 740 can include a main pump driver that may be an electric motor rated at or around 15 HP (211.2 kW) and 230 VAC or 460 VAC. Typically the main pump assembly 740 would have a more powerful motor and impart a greater pressure to the liquid fuel than the boost pump assembly 730. The electric motor of the main pump assembly 740 can be powered and/or controlled by the electrical control system 709. Alternatively, the main pump assembly 740 may include any other fuel pump and driver configurations meeting the particular specifications of the fuel system.

The fuel controller 750 can be positioned between the second side 772 and the filter assembly 720. In an embodiment the fuel controller 750 is positioned between the boost pump assembly 730 and the air compressor assembly 705. In an embodiment the fuel controller 750 is positioned between the coalescer 760 and the air compressor assembly 705. In an embodiment the fuel controller 750 is closer to the fuel outlet 712 than the fuel filter assembly 720, the boost pump assembly 730, the main pump assembly 740, the coalescer 760, the air compressor assembly 705, the water purge system 707, and the electrical control assembly 709.

The fuel controller 750 can be a liquid fuel regulator which controls the flow of the liquid fuel to the gas turbine engine. In particular, the fuel controller 750 is fluidly coupled to the fuel outlet 712, and regulates the pressure of the liquid fuel from the main pump assembly 740 to the pressure that will be delivered to the gas turbine engine 101 via the fuel outlet 712. For example the fuel controller 750 may be an assembly of fluid components including valves, meters, switches, sensors, relays, flow paths, and couplings. Additionally, the fuel controller 750 may include simple support bracket or an entire support structure that couples the assembly of fluid components of fuel controller 750 together and provides a mounting interface between the fuel controller 750 and the base 702.

According to one embodiment, the fuel controller 750 (or components thereof) may be configured to perform a variety of functions. In particular, the fuel controller 750 may be configured to provide fuel shutoff, pressure regulation, flow regulation, and/or flow distribution, as well as feedback to a master control console (not shown) of the gas turbine engine 101. For example, the fuel controller 750 may include a primary shutoff valve 751, a secondary shutoff valve 752, a flowmeter 756, a main fuel control valve, a back pressure regulator, and a torch fuel shutoff valve. In some embodiments, the fuel controller 750 may also include a pilot (or secondary) fuel control valve (not shown).

Components of the fuel controller 750, such as the flowmeter 756, can be in electrical communication with and controlled by the electrical control system 709. For example the flowmeter 756 may send fuel flow information to the electrical control system 709.

According to one embodiment, one or more fluid components of the fuel controller 750 may be pneumatically activated. In particular, the fuel controller 750 may include an air interface and associated plumbing to bring air to one or more air powered components. For example, the fuel controller 750 may include a gas or clean air inlet for pilot air (also called "instrument air"—clean, filtered air supplied by the facility), and the plumbing (i.e., air lines, tubing, and/or other conduit) to provide a pneumatic supply to one or more pneumatic solenoid valves. According to one embodiment, at least one of the primary shutoff valve 751, the secondary shutoff valve 752, the main fuel control valve, the back pressure regulator, the torch fuel shutoff valve, and the pilot fuel control valve may include a pneumatic solenoid, a pilot air valve, and/or be pneumatically activated. According to another embodiment, the one or more pneumatic solenoids may be then activated by switches controlled remotely, such as by the electrical control system 709.

The fuel controller 750 can be configured to receive compressed gas or clean air from the air compressor assembly 705. The air compressor assembly 705 can be located between the electrical control system 709 and the second side 772. The air compressor assembly 705 can be located between the water purge system 707 and the second side 772. The air compressor assembly 705 can be positioned between the main pump assembly 740 and the third side 773. The air compressor assembly 705 can be positioned between the fuel controller 750 and the third side 773. The air compressor assembly 705 can be positioned diagonally opposite from the filter assembly 720.

In an embodiment the air compressor assembly 705 is closer to the second corner 782 than the fuel filter assembly 720, the boost pump assembly 730, the main pump assembly 740, the coalescer 760, the water purge system 707, and the electrical control assembly 709. The air compressor assembly 705 may be elongated and have a longitudinal axis 795. The longitudinal axis 795 can be oriented generally parallel with the second side 772 and the fourth side 774.

According to one embodiment, the air compressor assembly 705 may provide clean, compressed air to pilot air valves configured to operate the primary shutoff valve 751 and the secondary shutoff valve 752.

The water purge system 707 can be positioned between the air compressor assembly 705 and the fourth side 774. The water purge system 707 can be positioned between the electrical control system 709 and the third side 773. The water purge system 707 can be positioned diagonally opposite of the fuel inlet 710. In an embodiment the water purge system 707 is closer to the third corner 783 than the fuel filter assembly 720, the boost pump assembly 730, the main pump assembly 740, the coalescer 760, the air compressor assembly 705, and the electrical control assembly 709.

The electrical control system 709 can be positioned between the air compressor assembly 705 and the second side 772. The electrical control system 709 can be positioned between the filter assembly 720 and the water purge system 707. The electrical control system 709 can be positioned along the fourth side 774.

The electrical control system 709 may include a controller. The controller can include a program memory, a processor (sometimes called a microcontroller or a microprocessor), a random-access memory (RAM), and an input/output (I/O) circuit, all of which can be interconnected via an address/data bus. The controller may include multiple microprocessors. Similarly, the memory of the controller may include multiple RAMs and multiple program memories. The program memory and RAM can be a non-transitory computer-readable medium having stored thereon computer-executable code (e.g., disclosed software or subroutines) and/or data. The program memory and/or the RAM may store various applications (i.e., machine readable instructions) for execution by the microprocessor.

The functional components of the fuel delivery system 700 can be secured together as a single, portable unit, separate from the support platform 103 of a gas turbine engine 101. In particular, the functional components of the fuel delivery system 700 are mounted to the base 702. For example, each functional component may be mounted directly to the base 702 and/or to support brackets that are mounted to the base 702. In some embodiments, one or more components, such as the fluid and gas interfaces, may be mounted to the cover 708 or a frame-type support structure of the fuel delivery system 700 rather than directly to the base 702.

INDUSTRIAL APPLICABILITY

The present disclosure generally applies to a fuel delivery system 700 for a machine 101 such as a gas turbine engine.

The described embodiments are not limited to use in conjunction with a particular type of machine or gas turbine engine. For example the fuel delivery system can be for mobile gas turbine engines or stationary gas turbine engines. Machines such as gas turbine engines, and thus their components and support systems, may be suited for any number of industrial applications, such as, but not limited to, various aspects of the oil and natural gas industry (including transmission, gathering, storage, withdrawal, and lifting of oil and natural gas), power generation industry, aerospace and transportation industry, to name a few examples.

Generally, embodiments of the presently disclosed fuel delivery system 700 are applicable to the use, operation, maintenance, repair, and improvement of gas turbine engines, and may be used in order to improve performance and efficiency, decrease maintenance and repair, and/or lower costs. In addition, embodiments of the presently disclosed fuel delivery system 700 may be applicable at any stage of the gas turbine engine's life, from design to prototyping and first manufacture, and onward to end of life. Accordingly, the fuel delivery system 700 may be used in conjunction with a retrofit or enhancement to existing gas turbine engines, as a preventative measure, or even in response to an event.

Some gas turbine engines 101 can primarily receive a gaseous fuel supply from a primary supply. Gas turbine engines 101 may also be configured to receive a secondary fuel supply 210 such as a liquid fuel. A portable fuel delivery system 700 can be used to condition and deliver the fuel from the secondary fuel supply 210 to a gas turbine engine 101.

The fuel delivery system 700 can include an electrical control system 709, an air compressor assembly 705, a water purge system 707, and a fuel conditioning assembly 701. The fuel delivery system 700 can define a fuel delivery path that can extend from the fuel inlet 710 to the fuel outlet 712.

The fuel delivery system 700 can receive a liquid fuel from a secondary fuel supply 210 at a fuel inlet 710. A boost pump assembly 730 can be located along the fuel delivery path and positioned fluidly between the fuel inlet 710 and the fuel outlet 712. From the fuel inlet 710, the liquid fuel can be received by the boost pump assembly 730 and be pressurized by the boost pump assembly 730. The fuel can be transported from the boost pump assembly 730 and filtered through the filter assembly 720. The filter assembly 720 can be located along the fuel delivery path and positioned fluidly between the boost pump assembly 730 and the fuel outlet 712. The filter assembly 720 can remove contaminants and/or foreign matter from liquid fuel. From the filter assembly 720 the liquid fuel can be transported to and filtered with a coalescer 760. The coalescer 760 can be located along the fuel delivery path and fluidly positioned between the filter assembly 720 and the fuel outlet 712. The coalescer 760 can remove liquid particulates not filtered by the filter assembly 720. The liquid fuel can be transported from the coalescer 760 through to the fuel controller 750. The fuel controller can be located along the fuel delivery path and fluidly positioned between the coalescer 760 and the fuel outlet 712.

The liquid fuel can be transported through a flowmeter 756 and a primary shutoff valve 751 of the fuel controller 750. The flowmeter 756 can be located along the fuel delivery path and fluidly positioned between the coalescer 760 and the fuel outlet 712. The flowmeter 756 can be used to monitor the flow of the liquid fuel, for example in gallons per minute. The flow information from the flowmeter 756 can be used to evaluate the fuel delivery system performance and adjust system operation if the flow readings are not within calculated requirements or predefined limits. The flow information data can be calculated and evaluated by the electrical control system 709 and used to control fuel flow out of the fuel delivery system 700.

The primary shutoff valve 751 can be located along the fuel delivery path and fluidly positioned between the flowmeter 756 and the fuel outlet 712. From the primary shutoff valve 751, the liquid fuel can be transported to a main pump assembly 740. The main pump assembly 740 can be located along the fuel delivery path and fluidly positioned between the primary shutoff valve 751 and the fuel outlet 712. The main pump assembly 740 further transfers the liquid fuel down the fuel delivery path. The liquid fuel can be transported from the main pump assembly 740, through the secondary shutoff valve 752, and to the fuel outlet 712. The secondary shutoff valve 752 can be located along the fuel delivery path and fluidly positioned between the main pump assembly 740 and the fuel outlet 712. From the fuel outlet 712 the liquid fuel can be transported to the injectors of the gas turbine engine 101.

The electrical control system 709 can be electrically connected to the gas turbine engine 101. The electrical control system 709 can be configured to receive power and information from the gas turbine engine 101. The electrical control system 709 can include and execute software logic to support the operation of the components of the fuel delivery system 700.

The electrical control system 709 can be configured to send control signals to the air compressor assembly 705 and water purge system 707. The electrical control system 709 can be configured to send control signals to solenoids to actuate fuel controls valves, the primary shutoff valve 751, and the secondary shutoff valve 752 of the fuel controller 750. The primary shutoff valve 751 and secondary shutoff valve 752 can be in fluid communication with the air compressor assembly 705 and be actuated with compressed air form the air compressor assembly 705. The air compressor assembly 705 can also provide compressed air for the liquid fuel startup torch and air atomizing manifold.

The boost pump assembly 730 and main pump assembly 740 can each be driven by their own electric motor. The electric motor can be controlled by a variable frequency drive of the electrical control system 709. The variable frequency drive can be controlled to change the speed of the electric motors and thus the fuel flow through the boost pump assembly 730 and the main pump assembly 740. The variable frequency drive can communicate with a Programmable Logic Controller (PLC) of the gas turbine engine 101. The variable frequency drive can be controlled to adjust the fuel flow the with respect to changes of the gas turbine engine's load and other gas turbine engine requirements.

The water purge system 707 can be used to purge liquid fuel from the fuel lines between transitions from liquid to gas fueling of the gas turbine engine 101 and can prevent the fuel lines from coking.

The fuel delivery system 700 can be configured to be lifted by machinery such as a crane of forklift and can be transported as a single unit. The fuel delivery system 700 can have outward dimensions that allow the fuel delivery system 700 to fit within a standard ISO container and can be transported or stored while inside of an ISO container. The positioning and orientation of the fuel delivery system components can be configured to allow the fuel delivery system 700 to fit into a container, promote a center of gravity that is balanced enough to be lifted with a forklift, and provide facilitated accessibility of the components for setup, inspection, & maintenance. In an embodiment, the components are positioned and oriented to mitigate pressure losses along fuel lines of the fuel delivery system 700.

The fuel delivery system 700 can be connected to a secondary fuel supply 210 via flexible and/or rigid hoses or tubing. Similarly the fuel delivery system 700 can be connected to the gas turbine engine 101 by flexible and/or rigid hoses and tubing.

The fuel delivery system 700 can be operated indoors or outdoors. The fuel delivery system 700 can include a cover 708 that covers approximately 100% of the footprint of the base 702.

In particular, the presently disclosed fuel delivery system 700 may provide for improved access and coordination of various components of the gas turbine engine's fuel delivery systems. The presently disclosed liquid fuel delivery system 700 may free space or "real estate" on the support platform of the gas turbine, allowing for access and upgrades to the existing gas turbine engines and new designs, which may have been previously unavailable.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A portable fuel delivery system for a machine, the portable fuel delivery system comprising:
    a base disposed separate from the machine;
    a fuel conditioning assembly mounted to the base and including
        a fuel inlet,
        a boost pump assembly in fluid communication with the fuel inlet,
        a filter assembly in fluid communication with the boost pump assembly,
        a coalescer in fluid communication with the filter assembly,
        a fuel controller in fluid communication with the coalescer and having a flow meter,
        a main pump assembly in fluid communication with the fuel controller, and
        a fuel outlet in fluid communication with the fuel controller;
    an electrical control system mounted to the base and in electrical communication with and controlling the boost pump assembly, the fuel controller, including the flow meter, and the main pump assembly and configured to be in electrical communication with the machine; and
    an air compressor assembly mounted to the base, in fluid communication with the fuel conditioning assembly to provide compressed air to actuate components of the fuel conditioning assembly and in electrical communication with and controlled by the electrical control system.

2. The portable fuel delivery system of claim 1, wherein outer dimensions of the portable fuel delivery system fit within a standard ISO container.

3. The portable fuel delivery system of claim 1, wherein the portable fuel delivery system is configured to receive liquid fuel and transfer the liquid fuel to the machine.

4. The portable fuel delivery system of claim 1, wherein the portable fuel delivery system includes a cover having an outer perimeter equal to at least a footprint of the base.

5. The portable fuel delivery system of claim 1, wherein the coalescer is positioned between the filter assembly and the boost pump assembly.

6. The portable fuel delivery system of claim 1, wherein the fuel controller further include a primary shutoff valve and a secondary shutoff valve; and wherein the main pump assembly is fluidly positioned between the primary shutoff valve and the secondary shutoff valve.

7. The portable fuel delivery system of claim 6, wherein the air compressor assembly is in fluid communication with the primary shutoff valve and the secondary shutoff valve.

8. A fuel delivery system for a machine, the fuel delivery system comprising:
    a base including
        a first side,
        a second side,
        a third side opposite the first side, and
        a fourth side opposite the second side,
    a fuel conditioning assembly mounted to the base and including
        a fuel inlet positioned proximate to the first side and second side,
        a boost pump assembly positioned proximate to the fuel inlet,
        a filter assembly positioned between the boost pump assembly and the second side,
        a coalescer positioned proximate to the first side,
        a main pump assembly,
        a fuel controller positioned above the main pump assembly and having a flow meter, and
        a fuel outlet positioned proximate to the fuel controller;
    an air compressor assembly mounted to the base, in fluid communication with the fuel conditioning assembly to provide compressed air to actuate components of the fuel conditioning assembly; and
    an electrical control system mounted to the base and in electrical communication with and controlling the boost pump assembly, the fuel controller, the flow meter, the main pump assembly and the air compressor assembly and configured to be in electrical communication with the machine.

9. The fuel delivery system of claim 8, wherein the fuel delivery system further comprises a water purge system positioned proximate to the third side and forth side.

10. The fuel delivery system of claim 8, wherein the main pump assembly is positioned between the air compressor assembly and the first side.

11. The fuel delivery system of claim 8, wherein the coalescer is positioned between the fuel controller and the first side.

12. The fuel delivery system of claim 11, wherein the coalescer is positioned between the filter assembly and the boost pump assembly.

13. The fuel delivery system of claim 8, wherein the boost pump assembly is positioned between the fuel controller and the first side.

14. A portable fuel delivery system for a gas turbine engine, the portable fuel delivery system comprising:

a fuel inlet;
a fuel outlet;
a fuel delivery path extending from the fuel inlet to the fuel outlet;
a boost pump assembly positioned along the fuel delivery path and fluidly positioned between the fuel inlet and the fuel outlet;
a filter assembly positioned along the fuel delivery path and fluidly positioned between the boost pump assembly and the fuel outlet;
a coalescer positioned along the fuel delivery path and fluidly positioned between the filter assembly and the fuel outlet;
a fuel controller positioned along the fuel delivery path and fluidly positioned between the coalescer and the fuel outlet and having a flow meter; and
 a main pump assembly positioned along the fuel delivery path and fluidly positioned between the coalescer and the fuel outlet;
an air compressor assembly in fluid communication with the fuel conditioning assembly to provide compressed air to actuate components of the fuel conditioning assembly; and
an electrical control system in electrical communication with and controlling the boost pump assembly, the fuel controller, the main pump assembly and the air compressor assembly and configured to be in electrical communication with the machine.

15. The portable fuel delivery system of claim 14, wherein the fuel controller further includes
a flowmeter; and
a primary shutoff valve in flow communication with the flowmeter and fluidly positioned between the flowmeter and the main pump assembly.

16. The portable fuel delivery system of claim 15, wherein the fuel controller further includes
a secondary shutoff valve in flow communication with the main pump assembly and fluidly positioned between the main pump assembly and the fuel outlet.

17. The portable fuel delivery system of claim 16, wherein the primary shutoff valve and the secondary shutoff valve are in fluid communication with the air compressor assembly.

* * * * *